United States Patent
Matsumoto

(10) Patent No.: US 6,382,197 B1
(45) Date of Patent: May 7, 2002

(54) SECONDARY AIR SUPPLY SYSTEM FOR ENGINE OF MOTORCYCLE

(75) Inventor: Akio Matsumoto, Hamamatsu (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/512,457

(22) Filed: Feb. 24, 2000

(30) Foreign Application Priority Data

Feb. 25, 1999 (JP) .......................................... 11-048765

(51) Int. Cl.[7] ................................................ F01N 3/34
(52) U.S. Cl. ........................................ 123/585; 60/304
(58) Field of Search .......................... 60/305, 304, 306, 60/293; 123/73 V

(56) References Cited

U.S. PATENT DOCUMENTS 4,154,058 A * 5/1979 Mase et al. .................... 60/293
4,437,305 A * 3/1984 Ikenoya et al. ................ 60/293
4,437,306 A * 3/1984 Ikenoya et al. ................ 60/293

* cited by examiner

*Primary Examiner*—Marguerite McMahon
*Assistant Examiner*—Hyder Ali
(74) *Attorney, Agent, or Firm*—Oblon, Spivak, McClelland, Maier & Neustadt, P.C.

(57) ABSTRACT

A secondary air supply system for an engine of a motorcycle is provided with a secondary air valve composed of integrated reed valve and air-cut valve and the exhaust pipes are connected to exhaust ports formed to the engine. The secondary air valve is arranged at a substantially a central portion on a front side of the engine, below the exhaust ports and in a space between the exhaust pipes and the engine, and secondary air pipes extending from the secondary air valve are connected to secondary air ports formed to an upper portion of the exhaust ports.

19 Claims, 6 Drawing Sheets

SECONDARY AIR SUPPLY SYSTEM FOR ENGINE OF MOTORCYCLE

BACKGROUND OF THE INVENTION

The present invention relates to a secondary air supply system for an engine of a motorcycle.

There are known some types of engines including a structure in which, in order to clean or purify an exhaust gas discharged from a combustion chamber of the engine, a secondary air is supplied into an exhaust passage thereby to burn the exhaust gas to promote an oxidation of the exhaust gas.

For such engine structure, it is generally known as a secondary air supply method to use a reed valve which is opened by a negative pressure of a pressure wave of the exhaust gas, and in such structure, an air-cut valve for restricting the flow of the secondary air is connected so as to prevent an excessive air from entering into the exhaust gas passage.

In a case where the secondary air supply system of the structure mentioned above is equipped to an engine of a motorcycle, there is known a structure in which, for example, a reed valve and an air-cut valve are arranged independently or disposed to a frame disposed above the engine, or the reed valve and the air-cut valve are integrally arranged thereto.

However, in the arrangement in which the reed valve and the air-cut valve are disposed independently, the number of pipes, ducts or the like will increase and, hence, the arrangement or structure thereof will become complicated, which will results in cost increasing.

Moreover, in the arrangement in which the reed valve and the air-cut valve are disposed to the frame above the engine, a long pipe, duct or the like is required for connecting the reed valve and an exhaust valve. Further, since the reed valve and the air-cut valve must be located directly below a fuel tank, there is a fear of limiting a shape or inner volume of the fuel tank.

Furthermore, because the secondary air supply system must be disposed after the engine has been mounted to the frame, this assembling working must be performed in a narrow space, thus being inconvenient.

Still furthermore, in a case of a multi-cylinder engine, there is a fear that lengths of the pipes arranged between the reed valve and the respective exhaust pipes may not be made equal to each other in a certain location of the reed valve and the air-cut valve, and in such case, the exhaust gas cleaning effects may become different for the respective cylinders.

SUMMARY OF THE INVENTION

An object of the present invention is to substantially eliminate defects or drawbacks encountered in the prior art mentioned above and to provide a secondary air supply system for an engine of a motorcycle in which pipes, ducts or the like is made short in arrangement and assembling working can be easily and simply done.

This and other objects can be achieved according to the present invention by providing a secondary air supply system for an engine of a motorcycle, which is provided with a secondary air valve composed of integrated reed valve and air-cut valve and exhaust pipes are connected to exhaust ports formed at a front portion of the engine, wherein the secondary air valve is arranged at substantially a central portion in front of the engine, below the exhaust ports and in a space between the exhaust pipes and the engine, and secondary air pipes extending from the secondary air valve are connected to secondary air ports formed to an upper portion of the exhaust ports.

In a preferred embodiment of the secondary air supply system, the secondary air pipes once extend upward from the exhaust ports, then extend downward between the exhaust pipes along a front wall section of the engine and are then connected to the secondary air valve through heat resistant hoses, respectively.

The engine is provided with an even number of cylinders arranged in parallel to each other and the secondary air pipes are arranged between the parallel cylinders. In a desired example, the engine is a four-stroke-cycle engine provided with four cylinders respective two of which are arranged in parallel to each other.

The secondary air valve has a valve body in which an integrated structure of a reed valve and an air-cut valve is housed and the secondary air valve is mounted to a crank case of the engine through a bracket.

According to the structure or arrangement of the secondary air supply system for a motorcycle engine mentioned above, the pipe or duct arrangement can be made simple with short pipes or like, and, hence, the assembling working thereof can be also made simple and easy. The heat resistant hoses are used for the connection of the secondary air pipes to the secondary air valve, so that the heat resistant property can be improved.

In the parallel arrangement of the even number of cylinders, the pipe length can be made substantially equal, so that the exhaust gas cleaning function of the respective cylinders can be effectively made uniform.

The nature and further characteristic features of the present invention will be made further clear from the following descriptions made with reference to the accompanying drawings.

DESCRIPTION OF THE PREFERRED EMBODIMENTS

Figure 1:
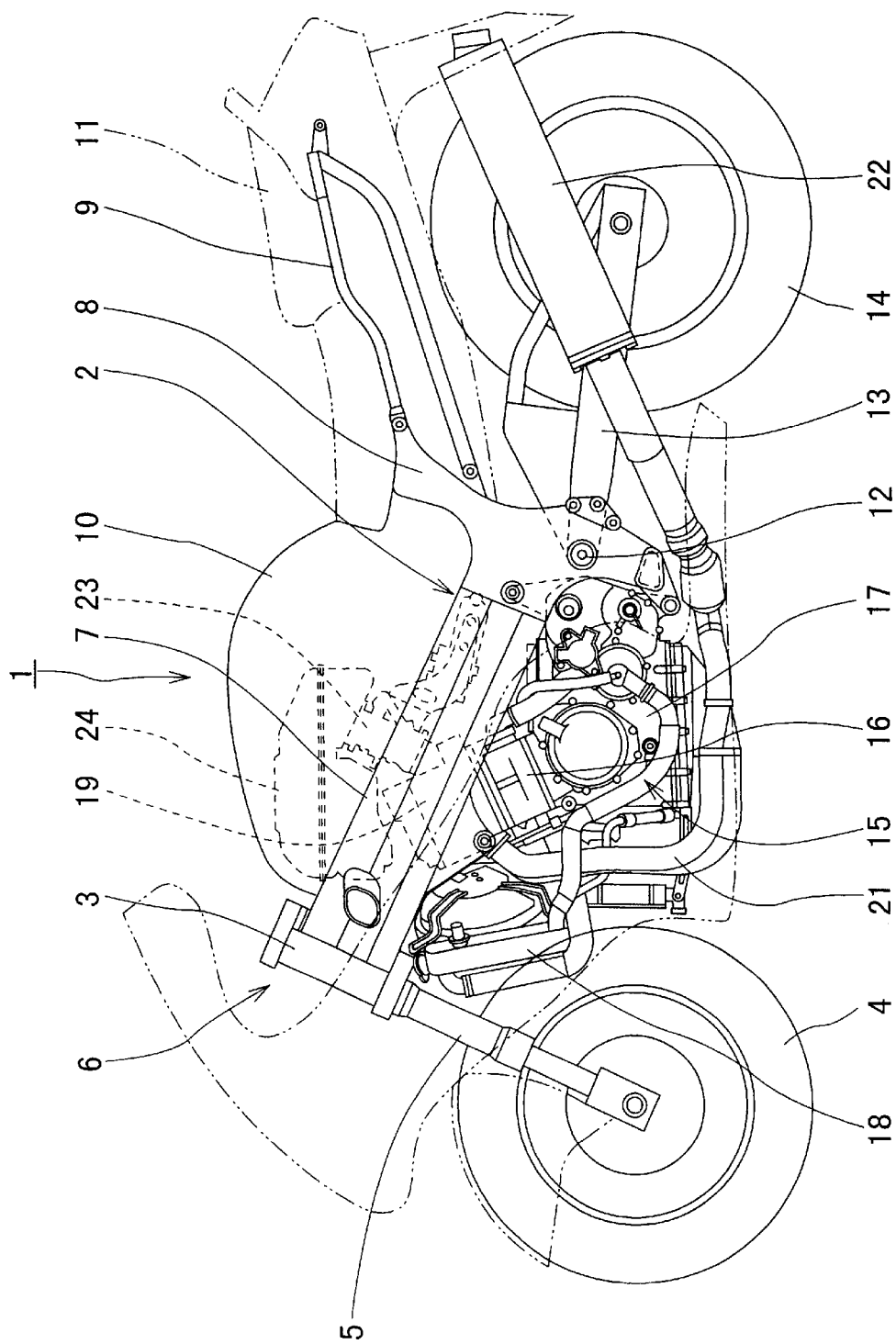
FIG. 1 is a side view of a motorcycle provided with a secondary air supply system for an engine according to one embodiment of the present invention.

FIG. 1 is a left side view of one example of a motorcycle to which the present invention is applied.

With reference to FIG. 1, a motorcycle 1 is equipped with a body frame 2 and a head pipe 3 disposed in front of the body frame 1. A suspension mechanism, not shown, is fitted to the head pipe 2 and constitutes a steering mechanism 6 together with a pair of bilateral front forks 5 supporting a front wheel 4 to be rotatable.

The body frame 2 has, for example, a twin-tube structure, which comprises a pair of bilateral tank rails 7 bilaterally widened at a directly rear portion of the head pipe 3 and then extending in parallel obliquely downward, a pair of bilateral center frame members 8 connected at both rear end portions of the tank rails 7 and extending upward therefrom, and a pair of bilateral seat rails 9 extending rearward from the rear upper end portions of the center frame members 8.

A fuel tank 10 is arranged above the tank rails 8 and a rider's seat 11 is disposed above the seat rails 9. A pivot shaft 12 is mounted to a central lower portion of the center frame members 8, swing arms 13 are mounted to the pivot shaft 12 to be swingable (pivotal) thereabout, and a rear wheel 14 is rotatably supported to the rear end portions of the swing arms 13. An engine or engine unit 15 is disposed below the central portion of the body frame 2 (i.e. below the fuel tank 10) at a portion between the front and rear wheels 4 and 14.

Figure 2:
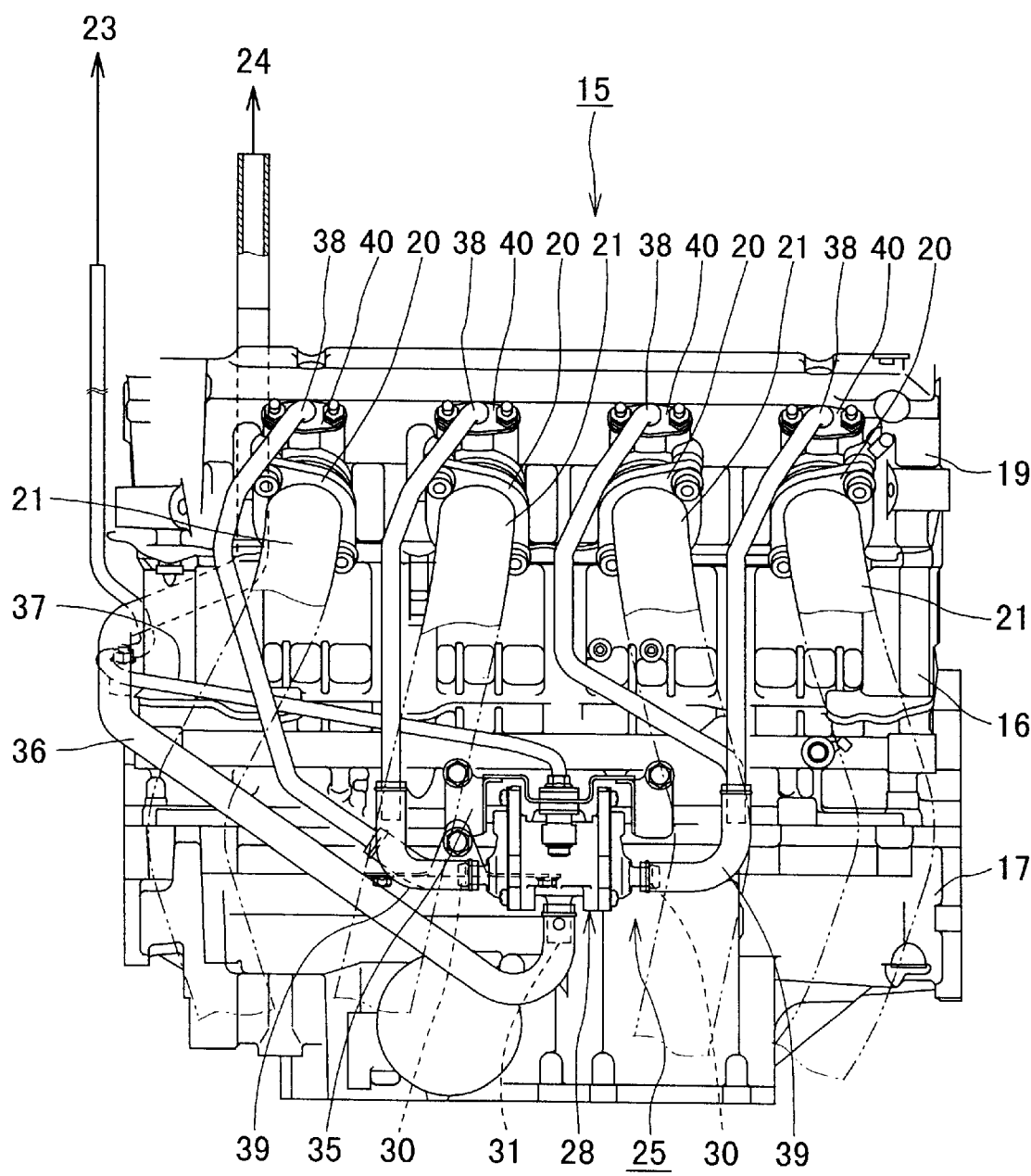
FIG. 2 is a front view of the engine.
Figure 3:
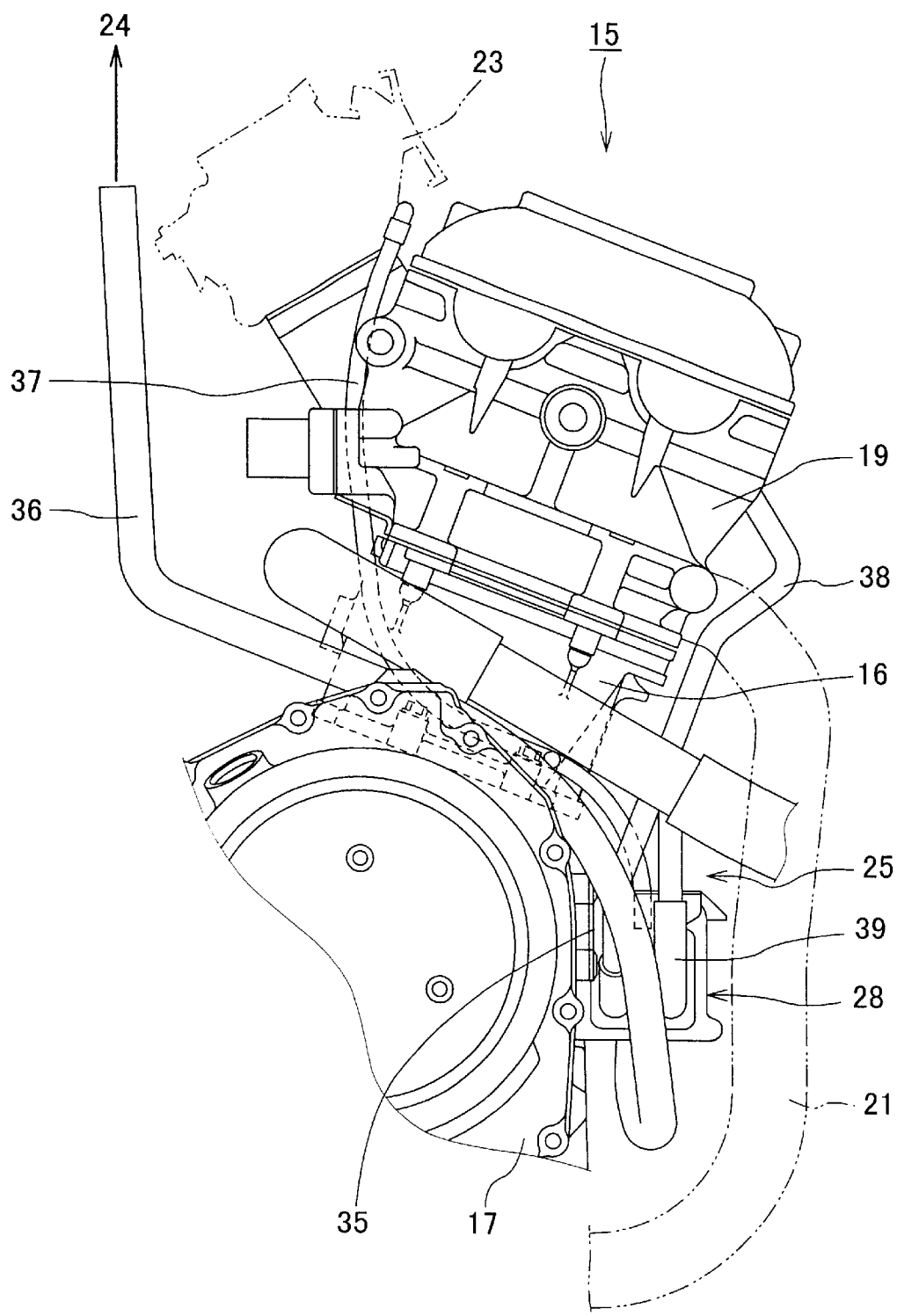
FIG. 3 is a right side view of the engine.

With reference to FIGS. 2 and 3 showing front and right side views of the engine 15, a water-cooling-parallel four-stroke-cycle engine is adopted as the engine 15, in which four cylinders 16, which are integrated, is arranged in a width direction of the motorcycle body at the upper portion of a crank case 17 so as to be inclined slightly forward. A radiator 18 for cooling the engine is arranged in front of the engine 15 and below the head pipe 3.

The respective cylinders 16 are formed with exhaust ports 20 on the front side of a cylinder head 19 and exhaust pipes 21 are connected to the exhaust ports 20, respectively. These exhaust pipes 21 once extend towards the lower portion of the engine 15 and are then bent so as to extend rearward therefrom. The downstream ends of the exhaust pipes 21 are connected to mufflers (a muffler) 22.

A throttle body 23 constituting a suction unit of a the engine 15 is connected to the rear upper side portion of the cylinder head 19, and an air cleaner 24 is also connected to the upstream side of the throttle body 23.

The engine 15 is provided with a secondary air supply system 25 for cleaning an exhaust gas discharged from a combustion chamber, not shown, of the engine 15 mounted to the motorcycle 1. The secondary air supply system 25 is adopted to supply a secondary air into an exhaust passage, not shown, thereby to promote oxidation of the exhaust gas through the combustion thereof and then to purify the gas. The secondary air supply system 25 hence comprises a reed valve 26 which opens in use of negative pressure of a pressure wave of the exhaust gas, an air-cut valve for limiting the secondary air flow so as to prevent an excessive air into the exhaust passage and duct or pipe members for connecting the reed valve 26 and the air-cut valve 27 to other elements or members.

Figure 4:
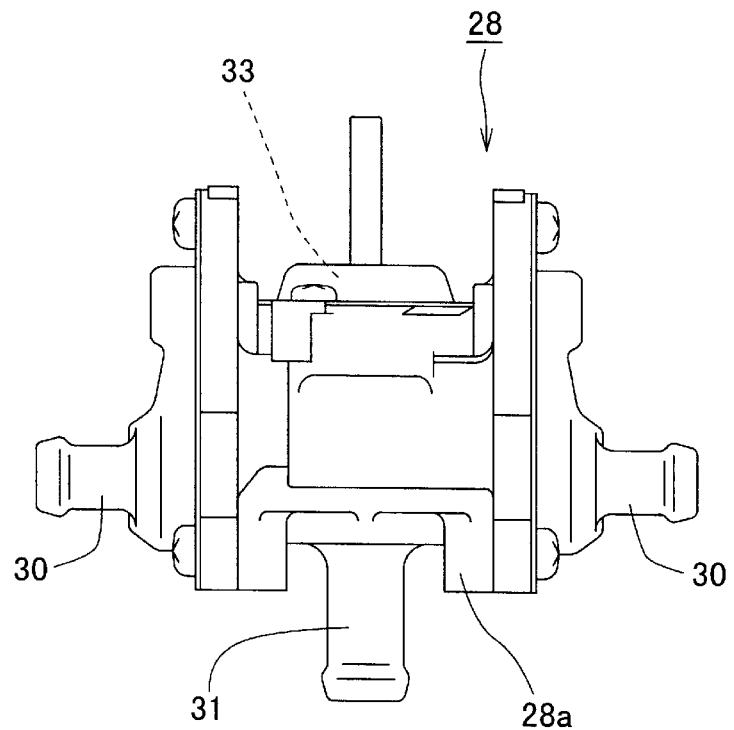
FIG. 4 is a front view of a secondary air valve of the secondary air supply system.

The reed valve 26 and the air cut valve 27 of the secondary air supply system 25 of the present invention will be integrated thereby to constitute a secondary air valve such as shown in FIG. 4.

Figure 5:
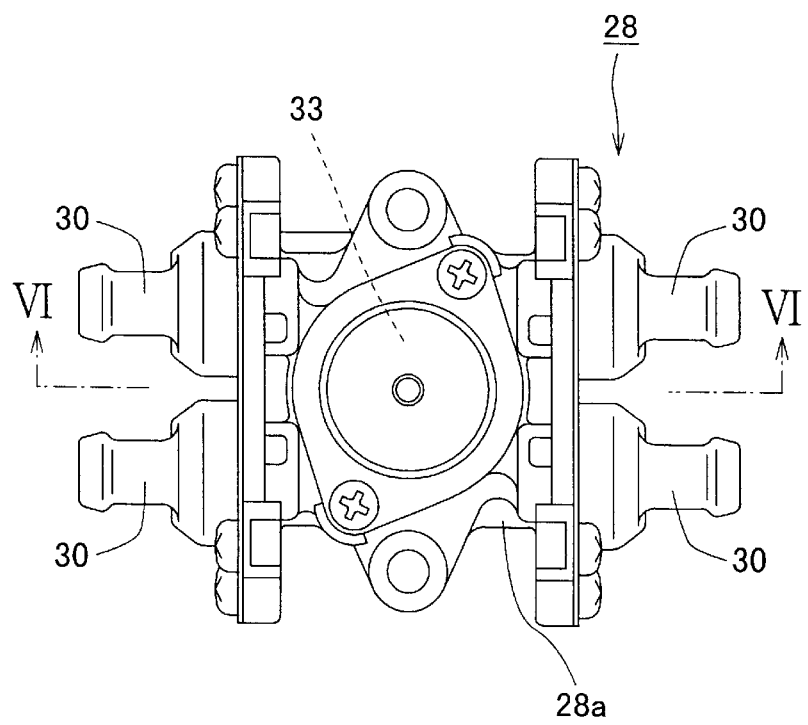
FIG. 5 is a plan view of the secondary air valve.
Figure 6:
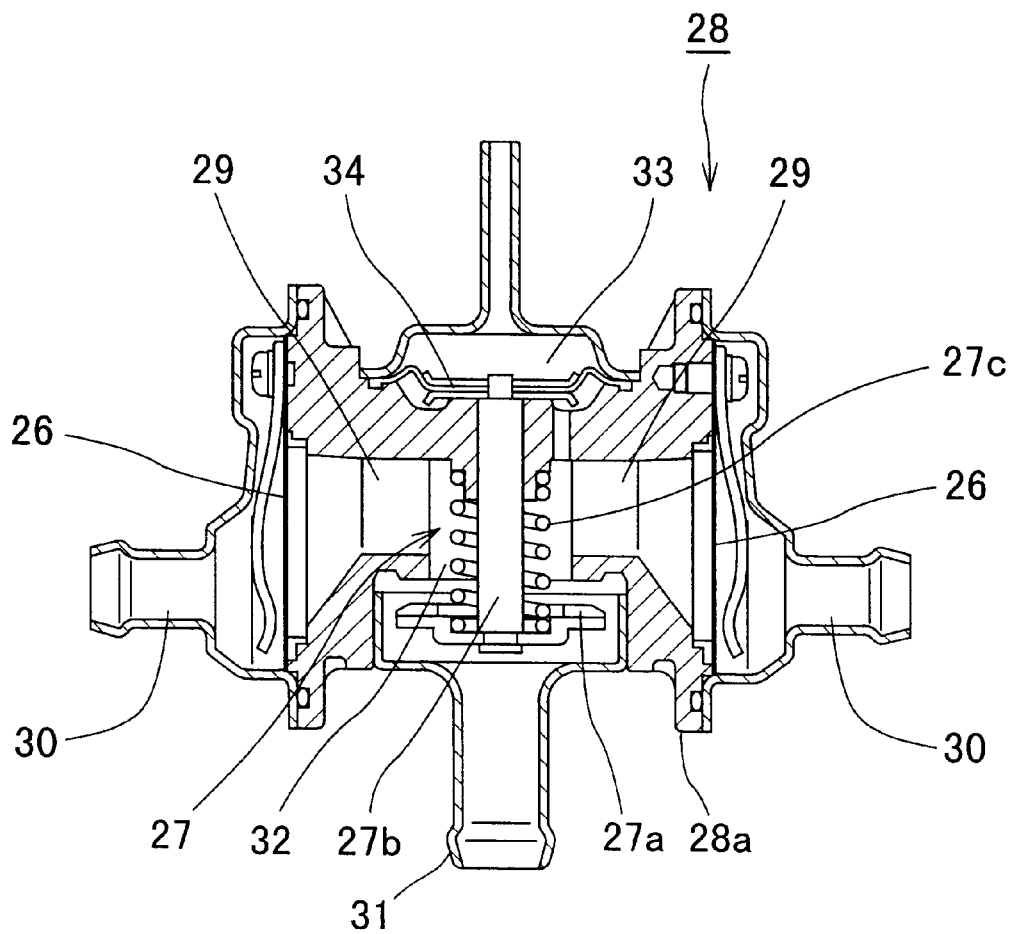
FIG. 6 is an elevational section of the secondary air valve taken along the line VI—VI in FIG. 5.

With reference to FIGS. 4 to 6, showing such secondary air valve 28, the secondary air valve 28 comprises a valve body 28a in which two secondary air chambers 29 each for two cylinders 16 of the engine 15 are formed, and each of the secondary air chambers 29 is provided with two secondary air outlets 30. The reed valve 26 is disposed between the secondary air chamber 29 and the outlet 30 so as to be opened only to the side of the outlet 30. A secondary air inlet 31 is formed to the lower portion, as viewed, of the valve body 28a of the secondary air valve 28 so as to be communicated with the respective secondary air chambers 29 through a communication passage 32.

The air-cut valve 27 is disposed on the way of the communication passage 32 so as to open or close the same. The air-cut valve 27 has a valve body 27a, which is formed to the lower end portion of a valve shaft 27b so as to be vertically reciprocal and usually maintain an opened state of the communication passage 32. Further, a negative pressure chamber 33 is formed above the valve body 28a of the secondary air valve 28, and the upper end portion of the valve shaft 27b is connected to a diaphragm 34 disposed in the negative pressure chamber 33.

Furthermore, as shown in FIGS. 2 and 3, the secondary air valve 28 is disposed in a space substantially at the central portion on the front side of the engine 15 below the exhaust port 20 and between the exhaust pipe 21 and the engine 15. The secondary air valve 28 is secured to the engine 15, for example, to the crank case 17 thereof through a bracket 35.

One end of a secondary air hose 36 is connected to the secondary air inlet 31 formed to the lower portion of the valve body 28a of the secondary air valve 28, and the other end of the secondary air hose 36 is connected to the air cleaner 24. Furthermore, one end of a vacuum hose 37 is connected to the negative pressure chamber 33 formed to the upper portion of the valve body 28a and the other end of the vacuum hose 37 is connected to a suction passage, not shown, of the throttle body 23.

To the respective secondary air outlets 30 formed to the secondary air valve 28, one ends of secondary air pipes 38 are connected through heat resistant hoses 39, and the other ends thereof are also connected to secondary air ports 40 formed to the upper portions of the respective exhaust ports 20. Each of the secondary air pipes 38 once extends upward and then extends downward between the exhaust pipes 21 along a front wall section of the cylinder 16.

Figure 7:
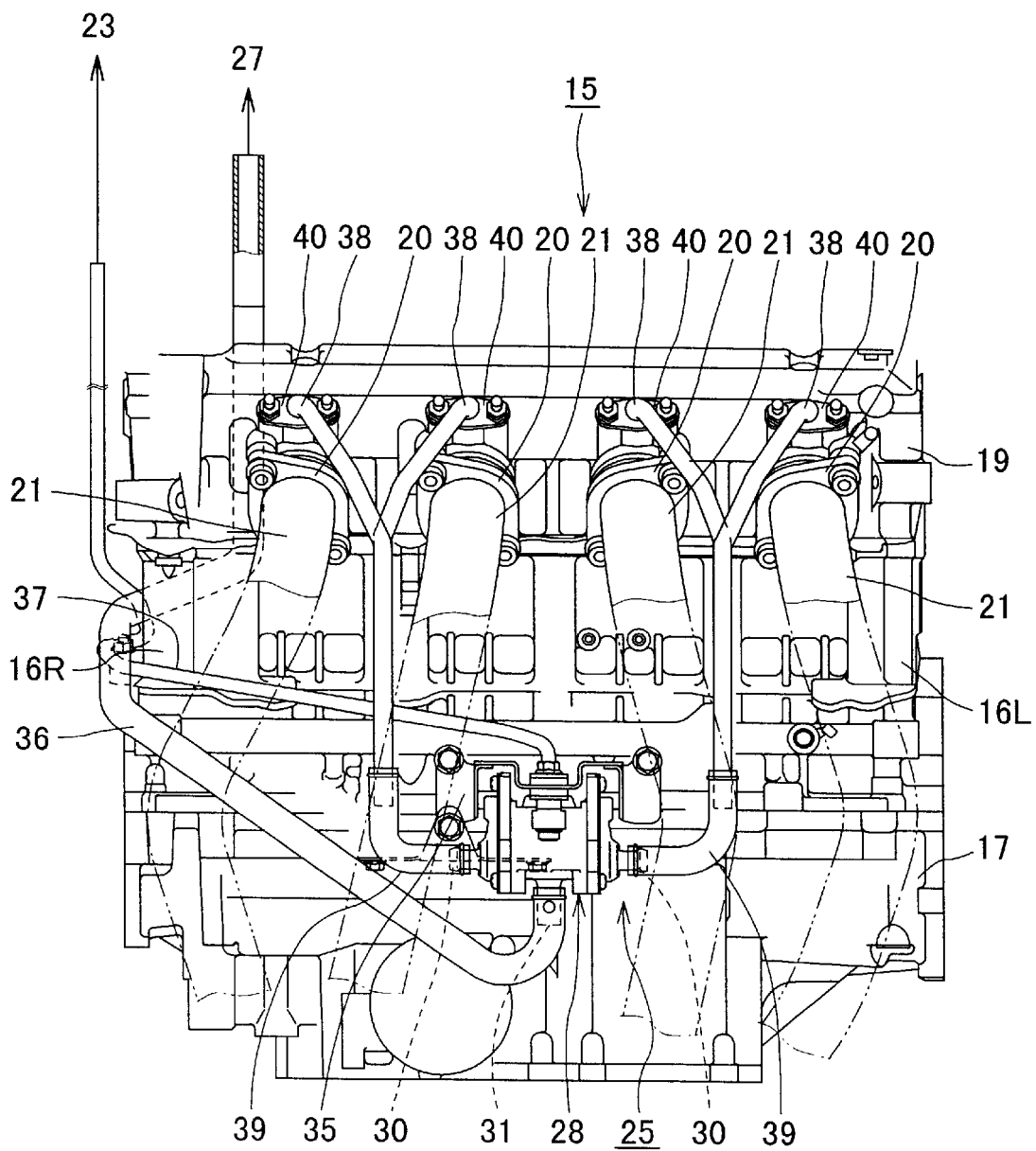
FIG. 7 is a front view of an engine of a motorcycle according to another embodiment of the present invention.

FIG. 7 is a front view of the engine 15 of a modified embodiment of the present invention.

With reference to FIG. 7, the engine 15 includes an even number of cylinders 16, that is, parallel four cylinders 16 as mentioned in the former embodiment, and in such case, secondary air pipes 38, each connecting the secondary air port 30 and the exhaust port 20, are arranged between left two cylinders 16L and right two cylinders 16R.

The engine 15 of the embodiment shown in FIG. 7 as operates as follows.

When the engine 15 starts to operate, the exhaust gas of high pressure is exhausted intermittently from the exhaust ports 20 through the exhaust pipes 21 thereby to generate a pressure wave in the exhaust pipes 21. At this time, since the secondary air chamber 29 of the secondary air valve 28 is mutually communicated with the secondary air port 40 of each of the exhaust ports 20 through the secondary air pipe 38 and the heat resistant hose 39, the reed valve 26 in the secondary air valve 28 is opened by means of the negative pressure generated in the exhaust pipe 21. Then, through the opening of the reed valve 26, the air in the air cleaner 24 is sucked into the exhaust port 20 as secondary air through the secondary air hose 36 and the secondary air chamber 29.

Since the secondary air valve 28 is arranged in the space substantially at the central portion on the front side of the engine 15 below the exhaust port 20 and between the exhaust pipe 21 and the engine 15, the distance between the reed valve 26 and the exhaust port 20 is shortened in comparison with the conventional structure, and hence, complicated piping arrangement or the like can be eliminated, thus being advantageous.

Furthermore, the pipe arrangement or assembling working except for the secondary air hose 36 and the vacuum hose 37 can be performed in the state that the secondary air valve 28 is mounted to the engine 15, so that the assembling working can be made more easily.

Still furthermore, since the secondary air valve 28, the secondary air pipe 38 and the heat resistant hose 39 are all arranged in the space between the front portion of the engine 15 and the back side portion of the exhaust pipe 21, the outer shape and the inner volume of the fuel tank 10 arranged above the engine 15 are not specifically restricted or limited.

Still furthermore, since the secondary air valve 28 is disposed at substantially the central portion in front of the engine 15, the secondary air pipes 38 and the like pipe arrangement have substantially the same length, the exhaust gas cleaning function for the respective cylinders can be substantially uniformly performed.

In the case of the engine 15 having an even number of the parallel cylinders 16 such as four-stroke-cycle engine mentioned above, the secondary air valves 28 are disposed between the left two cylinders 16L and between the right two cylinders 16R, so that the pipe arrangements thereof becomes substantially equal in length and, hence, the exhaust gas cleaning function for the respective cylinders can be substantially uniformly performed.

Further, although the secondary air pipe 38 made of metal material, which is connected to the exhaust port 20 through which the exhaust gas of high temperature is exhausted, the secondary pipe 38 is once extended upward from the exhaust port 20, then extended downward between the exhaust pipes 21 along the front wall section of the cylinders 16 and are connected to the secondary air outlet 30 of the secondary air valve 28 by way of the heat resistant hose 39, so that the secondary air pipe 38 is elongated in length and the heat is hence largely radiated, whereby the heat resistant property of the heat resistant hose 39 can be made low, resulting in the cost reducing.

It is to be noted that the present invention is not limited to the described embodiments and many other changes and modifications may be made without departing from the scopes of the appended claims.

For example, the present invention is applicable to a single-stroke-cycle engine (one cylinder) in place of the parallel four-stroke-cycle engine mentioned above. In the even number of cylinders, the secondary pipe can be arranged between two cylinders thereby to substantially make equal the secondary air pipe length.

What is claimed is:

1. A secondary air supply system for an engine of a motorcycle, comprising a secondary air valve having an integrated reed and an air-cut valve and exhaust pipes are connected to exhaust ports formed to a front portion of the engine, wherein said secondary air valve is arranged at substantially a central portion on a front side of the engine, below said exhaust ports and in a space between said exhaust pipes and said engine, and wherein secondary air pipes extending from said secondary air valve are connected to secondary air ports formed to an upper portion of the exhaust ports, wherein said secondary air valve has a valve body in which an integrated structure of a reed valve and an air-cut valve is housed and said secondary air valve is mounted to a crank case of the engine.

2. A secondary air supply system for an engine of a motorcycle, comprising a secondary air valve having an integrated reed valve and an air-cut valve and exhaust pipes are connected to exhaust ports formed to a front portion of the engine, wherein said secondary air valve is arranged at substantially a central portion on a front side of the engine, below said exhaust ports and in a space between said exhaust pipes and said engine, and wherein secondary air pipes extending from said secondary air valve are connected to secondary air ports formed to an upper portion of the exhaust ports, wherein said secondary air pipes once extend upward from the exhaust ports, then extend downward between the exhaust pipes along a front wall of the engine and are connected to the secondary air valve through heat resistant hoses, respectively.

3. A secondary air supply system according to claim 1, wherein said engine is provided with an even number of cylinders arranged in parallel to each other and said secondary air pipes are arranged between the cylinders in parallel arrangement.

4. A secondary air supply system according to claim 3, wherein said engine is a four-stroke-cycle engine provided with four cylinders respective two of which are arranged in parallel to each other.

5. A secondary air supply system for an engine of a motorcycle, comprising a secondary air valve having an integrated reed valve and an air-cut valve and exhaust pipes are connected to exhaust ports formed to a front portion of the engine, wherein said secondary air valve is arranged at substantially a central portion on a front side of the engine, below said exhaust ports and in a space between said exhaust pipes and said engine, and wherein secondary air pipes extending from said secondary air valve are connected to secondary air ports formed to an upper portion of the exhaust ports, wherein said secondary air valve has a valve body in which an integrated structure of a reed valve and an air-cut valve is housed and said secondary air valve is mounted to a crank case of the engine through a bracket.

6. The secondary air supply system for an engine of a motorcycle, comprising a secondary air valve having an integrated reed valve and an air-cut valve and exhaust pipes are connected to exhaust ports formed to a front portion of the engine, wherein said secondary air valve is arranged at substantially a central portion on a front side of the engine, below said exhaust ports and in a space between said exhaust pipes and said engine, and wherein secondary air pipes extending from said secondary air valve are connected to secondary air ports formed to an upper portion of the exhaust ports, wherein said secondary air valve includes an air chamber having an inlet adapted to be connected to an air cleaner of the motorcycle and an outlet adapted to be connected to the secondary air pipes, said reed valve selectively connecting said air chamber to said outlet.

7. The secondary air supply system for an engine of a motorcycle, comprising a secondary air valve having an integrated reed valve and an air-cut valve and exhaust pipes are connected to exhaust ports formed to a front portion of the engine, wherein said secondary air valve is arranged at substantially a central portion on a front side of the engine, below said exhaust ports and in a space between said exhaust pipes and said engine, and wherein secondary air pipes extending from said secondary air valve are connected to secondary air ports formed to an upper portion of the exhaust ports, wherein:

said secondary air valve includes a negative pressure chamber partially defined by a diaphragm, said negative pressure chamber being adapted to be fluidly connected to a throttle body of the motorcycle;

said secondary air valve includes an inlet adapted to be connected to an air cleaner of the motorcycle and an air chamber having an outlet adapted to be connected to the secondary air pipes; and said air cut valve includes a movable valve shaft and a valve body mounted to said valve shaft, said movable valve shaft connected to and actuatable via said diaphragm, said valve body selectively connecting said inlet to said air chamber.

8. The secondary air supply system according to claim 7, wherein said air cut valve further includes a spring configured to bias said valve body to an open position where said inlet is fluidly connected to said air chamber.

9. The secondary air supply system for an engine of a motorcycle, comprising a secondary air valve having an integrated reed valve and an air-cut valve and exhaust pipes are connected to exhaust ports formed to a front portion of the engine, wherein said secondary air valve is arranged at substantially a central portion on a front side of the engine, below said exhaust ports and in a space between said exhaust pipes and said engine, and wherein secondary air pipes extending from said secondary air valve are connected to secondary air ports formed to an upper portion of the exhaust ports, wherein:
said secondary air valve includes an air chamber having an inlet adapted to be connected to an air cleaner of the motorcycle and an outlet adapted to be connected to the secondary air pipes, said reed valve selectively connecting said air chamber to said outlet;
said secondary air valve includes a negative pressure chamber partially defined by a diaphragm, said negative pressure chamber being adapted to be fluidly connected to a throttle body of the motorcycle; and
said air cut valve includes a movable valve shaft and a valve body mounted to said valve shaft, said movable valve shaft connected to and actuatable via said diaphragm, said valve body selectively connecting said inlet to said air chamber.

10. A motorcycle comprising:
an engine;
exhaust ports with secondary air ports, said exhaust ports being provided on a front side of said engine;
exhaust pipes connected to said exhaust ports;
a secondary air valve having an integrated reed valve and an air-cut valve, said secondary air valve being arranged on said front side of said engine, said secondary air valve being arranged below said exhaust ports and in a space between said exhaust pipes and said engine; and
secondary air pipes extending from said secondary air valve are connected to said secondary air ports,
wherein said secondary air valve has a valve body in which said integrated reed valve and said air-cut valve are housed and said secondary air valve is mounted to a crank case of the engine.

11. The motorcycle comprising:
an engine;
exhaust ports with secondary air ports, said exhaust ports being provided on a front side of said engine;
exhaust pipes connected to said exhaust ports;
a secondary air valve having an integrated reed valve and an air-cut valve, said secondary air valve being arranged on said front side of said engine, said secondary air valve being arranged below said exhaust ports and in a space between said exhaust pipes and said engine; and
secondary air pipes extending from said secondary air valve are connected to said secondary air ports, wherein:
said motorcycle further comprises an air cleaner; and
said secondary air valve includes an air chamber having an inlet connected to said air cleaner and an outlet connected to said secondary air pipes, said reed valve selectively connecting said air chamber to said outlet.

12. The motorcycle comprising:
an engine;
exhaust ports with secondary air ports, said exhaust ports being provided on a front side of said engine;
exhaust pipes connected to said exhaust ports;
a secondary air valve having an integrated reed valve and an air-cut valve, said secondary air valve being arranged on said front side of said engine, said secondary air valve being arranged below said exhaust ports and in a space between said exhaust pipes and said engine; and
secondary air pipes extending from said secondary air valve are connected to said secondary air ports, wherein:
said motorcycle further comprises an air cleaner and a throttle body;
said secondary air valve includes a negative pressure chamber partially defined by a diaphragm, said negative pressure chamber being fluidly connected to said throttle body;
said secondary air valve includes an inlet connected to said air cleaner and an air chamber having an outlet connected to said secondary air pipes; and
said air cut valve includes a movable valve shaft and a valve body mounted to said valve shaft, said movable valve shaft connected to and actuatable via said diaphragm, said valve body selectively connecting said inlet to said air chamber.

13. The motorcycle according to claim 12, wherein said air cut valve further includes a spring configured to bias said valve body to an open position where said inlet is fluidly connected to said air chamber.

14. The motorcycle comprising:
an engine;
exhaust ports with secondary air ports, said exhaust ports being provided on a front side of said engine;
exhaust pipes connected to said exhaust ports;
a secondary air valve having an integrated reed valve and an air-cut valve, said secondary air valve being arranged on said front side of said engine, said secondary air valve being arranged below said exhaust ports and in a space between said exhaust pipes and said engine; and
secondary air pipes extending from said secondary air valve are connected to said secondary air ports, wherein:
said motorcycle further comprises an air cleaner and a throttle body;
said secondary air valve includes an air chamber having an inlet connected to said air cleaner and an outlet connected to said secondary air pipes, said reed valve selectively connecting said air chamber to said outlet;
said secondary air valve includes a negative pressure chamber partially defined by a diaphragm, said negative pressure chamber being fluidly connected to said throttle body; and
said air cut valve includes a movable valve shaft and a valve body mounted to said valve shaft, said movable valve shaft connected to and actuatable via said diaphragm, said valve body selectively connecting said inlet to said air chamber.

15. A secondary air supply system for an engine of a motorcycle, the engine having exhaust ports with secondary air ports on a front side and exhaust pipes connected to the exhaust ports, said secondary air supply system comprising a secondary air valve having an integrated reed valve and an air-cut valve, said secondary air valve being adapted to be arranged on the front side of the engine below the exhaust ports and in a space between the exhaust pipes and the engine, said secondary air valve being adapted to be connected to the secondary air ports, wherein said secondary air valve has a valve body in which said integrated reed valve and said air-cut valve are housed and said secondary air valve is mounted to a crank case of the engine.

16. The secondary air supply system for an engine of a motorcycle, the engine having exhaust ports with secondary air ports on a front side and exhaust pipes connected to the exhaust ports, said secondary air supply system comprising a secondary air valve having an integrated reed valve and an air-cut valve, said secondary air valve being adapted to be arranged on the front side of the engine below the exhaust ports and in a space between the exhaust pipes and the engine, said secondary air valve being adapted to be connected to the secondary air ports, wherein said secondary air valve includes an air chamber having an inlet adapted to be connected to an air cleaner of the motorcycle and an outlet adapted to be connected to the secondary air pipes, said reed valve selectively connecting said air chamber to said outlet.

17. A secondary air supply system for an engine of a motorcycle, the engine having exhaust ports with secondary air ports on a front side and exhaust pipes connected to the exhaust ports, said secondary air supply system comprising a secondary air valve having an integrated reed valve and an air-cut valve, said secondary air valve being adapted to be arranged on the front side of the engine below the exhaust ports and in a space between the exhaust pipes and the engine, said secondary air valve being adapted to be connected to the secondary air ports, wherein:

said secondary air valve includes a negative pressure chamber partially defined by a diaphragm, said negative pressure chamber being adapted to be fluidly connected to a throttle body of the motorcycle;

said secondary air valve includes an inlet adapted to be connected to an air cleaner of the motorcycle and an air chamber having an outlet adapted to be connected to the secondary air pipes; and said air cut valve includes a movable valve shaft and a valve body mounted to said valve shaft, said movable valve shaft connected to and actuatable via said diaphragm, said valve body selectively connecting said inlet to said air chamber.

18. The secondary air supply system according to claim 17, wherein said air cut valve further includes a spring configured to bias said valve body to an open position where said inlet is fluidly connected to said air chamber.

19. A secondary air supply system for an engine of a motorcycle, the engine having exhaust ports with secondary air ports on a front side and exhaust pipes connected to the exhaust ports, said secondary air supply system comprising a secondary air valve having an integrated reed valve and an air-cut valve, said secondary air valve being adapted to be arranged on the front side of the engine below the exhaust ports and in a space between the exhaust pipes and the engine, said secondary air valve being adapted to be connected to the secondary air ports, wherein:

said secondary air valve includes an air chamber having an inlet adapted to be connected to an air cleaner of the motorcycle and an outlet adapted to be connected to the secondary air pipes, said reed valve selectively connecting said air chamber to said outlet;

said secondary air valve includes a negative pressure chamber partially defined by a diaphragm, said negative pressure chamber being adapted to be fluidly connected to a throttle body of the motorcycle; and said air cut valve includes a movable valve shaft and a valve body mounted to said valve shaft, said movable valve shaft connected to and actuatable via said diaphragm, said valve body selectively connecting said inlet to said air chamber.

\* \* \* \* \*